(12) United States Patent
Krishna Kumar et al.

(10) Patent No.: US 10,098,095 B2
(45) Date of Patent: Oct. 9, 2018

(54) FEEDBACK TO ENHANCE RATE PREDICTION WITH BURSTY INTERFERENCE

(71) Applicant: QUALCOMM Incorporated, San Diego, CA (US)

(72) Inventors: Raj Kumar Krishna Kumar, Bangalore (IN); Kapil Bhattad, Bangalore (IN); Dhananjay Ashok Gore, Bangalore (IN); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 13/898,398

(22) Filed: May 20, 2013

(65) Prior Publication Data

US 2013/0315198 A1  Nov. 28, 2013

Related U.S. Application Data

(60) Provisional application No. 61/651,879, filed on May 25, 2012.

(51) Int. Cl.
*H04W 72/04* (2009.01)
*H04L 1/00* (2006.01)
(Continued)

(52) U.S. Cl.
CPC ....... *H04W 72/0413* (2013.01); *H04L 1/0003* (2013.01); *H04L 1/0009* (2013.01);
(Continued)

(58) Field of Classification Search
CPC ............. H04W 72/0413; H04W 72/04; H04W 11/0026; H04L 1/1825; H04L 1/0003
See application file for complete search history.

(56) References Cited

U.S. PATENT DOCUMENTS 8,331,342 B2  12/2012  Khan et al.
8,428,042 B1*  4/2013  Chion .................. H04L 1/0016
370/208

(Continued)

FOREIGN PATENT DOCUMENTS

CN  102098134 A  6/2011
EP  1871028 A1  12/2007
(Continued)

OTHER PUBLICATIONS

Partial International Search Report—PCT/US2013/042054—ISA/EPO—dated Jul. 24, 2013.
(Continued)

*Primary Examiner* — Hassan Kizou
*Assistant Examiner* — Deepa Belur
(74) *Attorney, Agent, or Firm* — Dalei Dong; Arent Fox

(57) ABSTRACT

When a UE does not completely decode a packet transmitted from a base station, the UE may send ACK/NACK to the base station, upon which the base station may retransmit the packet based on the ACK/NACK. However, the ACK/NACK fails to provide the base station with information needed by the UE for completely decoding the packet. Accordingly, a method, an apparatus, and a computer program product for wireless communication are provided. The apparatus receives a packet from a base station having a first MCS, determines information to provide to the base station, wherein the information comprises CQI relating to a channel condition and/or interference condition corresponding to time-frequency resources allocated for the received packet, and sends the information to the base station. Thereafter, the apparatus re-receives the packet from the base station, the re-received packet having a second MCS according to the information sent to the base station.

79 Claims, 13 Drawing Sheets

(51) Int. Cl.
*H04L 1/16* (2006.01)
*H04L 1/18* (2006.01)

(52) U.S. Cl.
CPC .......... *H04L 1/0026* (2013.01); *H04L 1/0027* (2013.01); *H04L 1/1607* (2013.01); *H04L 1/1825* (2013.01); *H04L 1/1854* (2013.01); *H04L 1/1867* (2013.01)

(56) References Cited

U.S. PATENT DOCUMENTS

| | | | |
|---|---|---|---|
| 2003/0123477 A1* | 7/2003 | Gollamudi | H04L 1/0021 370/465 |
| 2005/0013303 A1* | 1/2005 | Gopalakrishnan | H04L 1/0003 370/395.21 |
| 2006/0159061 A1* | 7/2006 | Takano et al. | 370/352 |
| 2007/0275712 A1 | 11/2007 | Sebire et al. | |
| 2008/0045228 A1* | 2/2008 | Zhang | H04L 1/0015 455/450 |
| 2008/0101280 A1* | 5/2008 | Gholmieh et al. | 370/328 |
| 2008/0144552 A1* | 6/2008 | Johansson | H04L 1/0026 370/310 |
| 2009/0022098 A1 | 1/2009 | Novak et al. | |
| 2009/0046800 A1* | 2/2009 | Xu et al. | 375/267 |
| 2009/0067557 A1* | 3/2009 | Zhengang | H04L 1/0025 375/346 |
| 2009/0073958 A1* | 3/2009 | Xu | 370/352 |
| 2009/0086845 A1 | 4/2009 | Demirhan et al. | |
| 2009/0191882 A1* | 7/2009 | Kovacs | H04L 1/0026 455/450 |
| 2009/0274037 A1* | 11/2009 | Lee | H04L 1/1812 370/208 |
| 2010/0075703 A1 | 3/2010 | Imai et al. | |
| 2010/0202386 A1* | 8/2010 | Takaoka | H04L 1/0083 370/329 |
| 2011/0075753 A1* | 3/2011 | Jung et al. | 375/267 |
| 2011/0087944 A1 | 4/2011 | Li et al. | |
| 2011/0110398 A1* | 5/2011 | Zhang et al. | 375/132 |
| 2011/0149792 A1* | 6/2011 | Nakano | H04W 24/10 370/252 |
| 2011/0194518 A1* | 8/2011 | Wu | 370/329 |
| 2011/0243012 A1* | 10/2011 | Luo | H04L 5/0055 370/252 |
| 2011/0268075 A1* | 11/2011 | Heo | H04L 5/0053 370/329 |
| 2011/0271162 A1 | 11/2011 | Jitsukawa et al. | |
| 2011/0273981 A1* | 11/2011 | Ktenas | H04L 1/1825 370/226 |
| 2012/0002603 A1 | 1/2012 | Lohr et al. | |
| 2012/0069755 A1 | 3/2012 | Li et al. | |
| 2012/0076028 A1* | 3/2012 | Ko | H04L 1/0026 370/252 |
| 2012/0082261 A1 | 4/2012 | Kishiyama et al. | |
| 2012/0120927 A1 | 5/2012 | Bucknell | |
| 2013/0039349 A1* | 2/2013 | Ebrahimi Tazeh Mahalleh | H04L 1/0013 370/336 |
| 2013/0121270 A1* | 5/2013 | Chen | H04L 5/001 370/329 |
| 2013/0279350 A1* | 10/2013 | Erickson | H04W 24/08 370/252 |
| 2014/0321359 A1* | 10/2014 | Seo | H04L 5/0057 370/328 |
| 2016/0028505 A1* | 1/2016 | Pi | H04L 1/0003 714/807 |
| 2016/0037365 A1* | 2/2016 | Makrakis | H04L 1/1825 370/252 |

FOREIGN PATENT DOCUMENTS

| | | | |
|---|---|---|---|
| EP | 1919231 | | 5/2008 |
| EP | 2075972 | A1 | 7/2009 |
| JP | 2007515862 | A | 6/2007 |
| JP | 2011501625 | A | 1/2011 |
| JP | 4983602 | B2 | 7/2012 |
| WO | 2005048564 | A1 | 5/2005 |
| WO | 2007023787 | A1 | 3/2007 |
| WO | 2008039856 | A2 | 4/2008 |
| WO | 2008045471 | A2 | 4/2008 |
| WO | WO 2008045471 | A2 * | 4/2008 ........... H04L 1/0025 |
| WO | 2008093619 | A1 | 8/2008 |
| WO | 2009055804 | A2 | 4/2009 |

OTHER PUBLICATIONS

Ghosh, A., et al., "Essentials of LTE and LTE-A", Aug. 4, 2011 (Aug. 4, 2011), Cambridge University Press, Cambridge, UK, XP002712177, ISBN: 978-0-521-76870-2, pp. 97-108.

International Search Report and Written Opinion—PCT/US2013/042054—ISA/EPO—dated Sep. 17, 2013.

NEC Group: "Miscellaneous corrections to 36.213 [online]", 3GPP TSG-RAN WG1#66 R1-112780, Aug. 26, 2011, p. 1-13, URL:http://www.3gpp.org/ftp/tsg_ran/WG1_RL1/TSGR1_66/Docs/R1-112780.zip.

Philips, "Control of CQI feedback signalling in E-UTRA", 3GPP DRAFT, R1-070348, 3rd Generation Partnership roject (3GPP), Mobile Competence Centre, 650, Route Des Lucioles, F-06921, Sophia—Antipolis Cedex, Rance, vol. RAN WG1, No. Sorrento, Italy, Jan. 10, 2007, XP050104382, [retrieved on Jan. 10, 2007], 3 Pages.

* cited by examiner

FEEDBACK TO ENHANCE RATE PREDICTION WITH BURSTY INTERFERENCE

CROSS-REFERENCE TO RELATED APPLICATION(S)

This application claims the benefit of U.S. Provisional Application Ser. No. 61/651,879, entitled "FEEDBACK TO ENHANCE RATE PREDICTION WITH BURSTY INTERFERENCE" and filed on May 25, 2012, which is expressly incorporated by reference herein in its entirety.

BACKGROUND

Field

The present disclosure relates generally to communication systems, and more particularly, to providing feedback for enhancing rate prediction in the presence of bursty interference.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

A user equipment (UE) completely decoding a packet transmitted from a base station may send a positive acknowledgment (ACK) to the base station. The UE may not be able to completely decode the packet and may send a negative acknowledgment (NACK) to the base station. Based on ACK/NACK, the base station is informed of whether the UE has completely decoded the transmitted packet, and may retransmit the packet accordingly. However, although NACK may be received by the base station when the UE cannot completely decode the packet, the base station is still unaware of any specific additional information needed by the UE for completely decoding the packet. Accordingly, the base station may be informed of the additional information needed by the UE for completely decoding the packet.

In an aspect of the disclosure, a method, an apparatus, and a computer program product for wireless communication are provided. The apparatus receives a packet from a base station having a first modulation and coding scheme (MCS), determines information to provide to the base station, wherein the information comprises channel quality information (CQI) relating to a channel condition and/or interference condition corresponding to time-frequency resources allocated for the received packet, and sends the information to the base station. Thereafter, in the event of a NACK having been sent to the base station, the apparatus re-receives the packet from the base station, the re-received packet possibly having a second MCS according to the information sent to the base station.

In another aspect of the disclosure, the apparatus transmits a packet to a UE, the packet having a first modulation and coding scheme (MCS) and receives information from the UE, wherein the information comprises channel quality information (CQI) relating to a channel condition and/or interference condition corresponding to time-frequency resources allocated for the transmitted packet. Thereafter, in the event of a NACK being received from the UE, the apparatus may optimize the packet to have a second MCS according to the received information, and retransmit the optimized packet to the UE.

DETAILED DESCRIPTION

Figure 1:
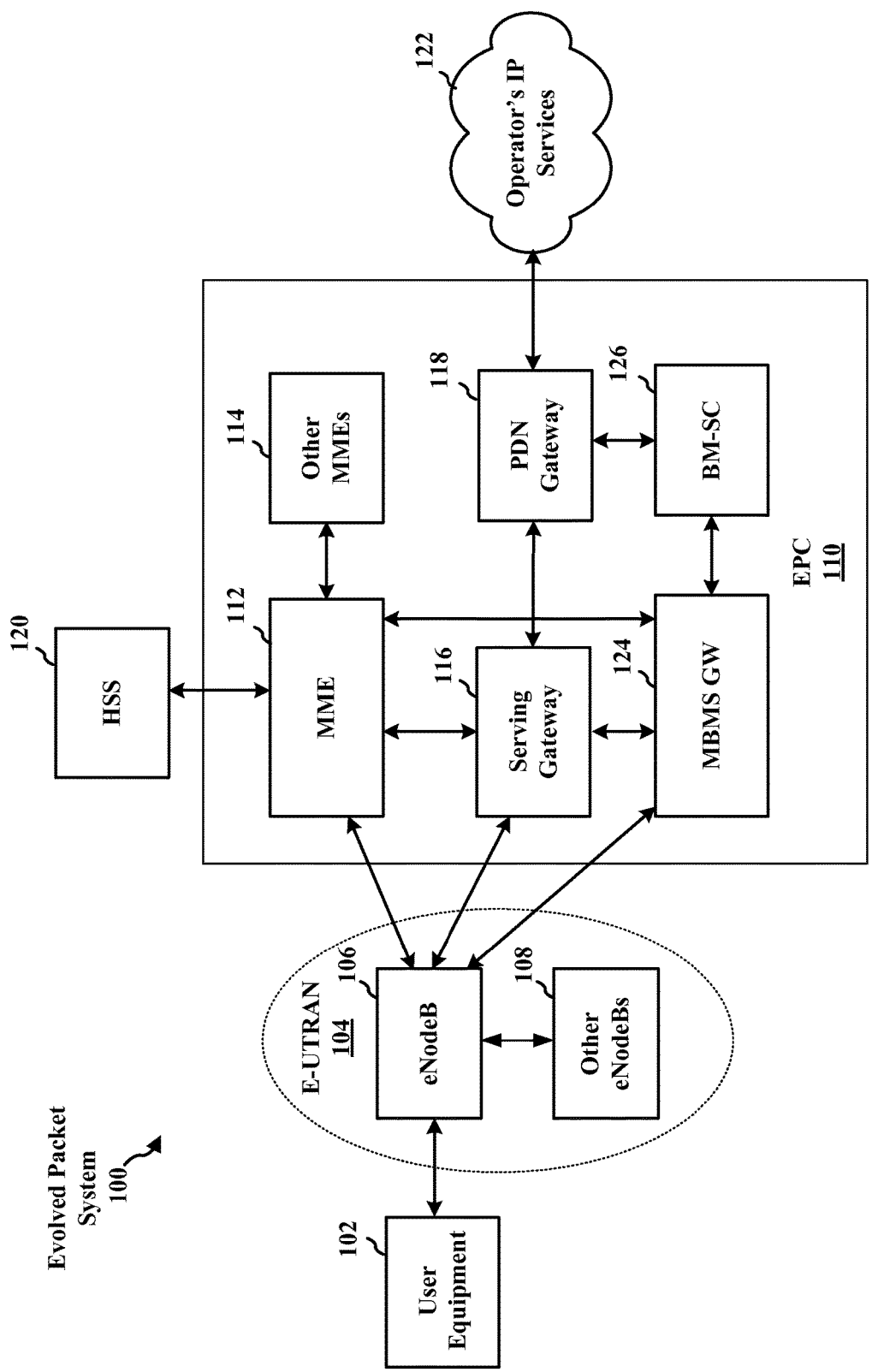
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
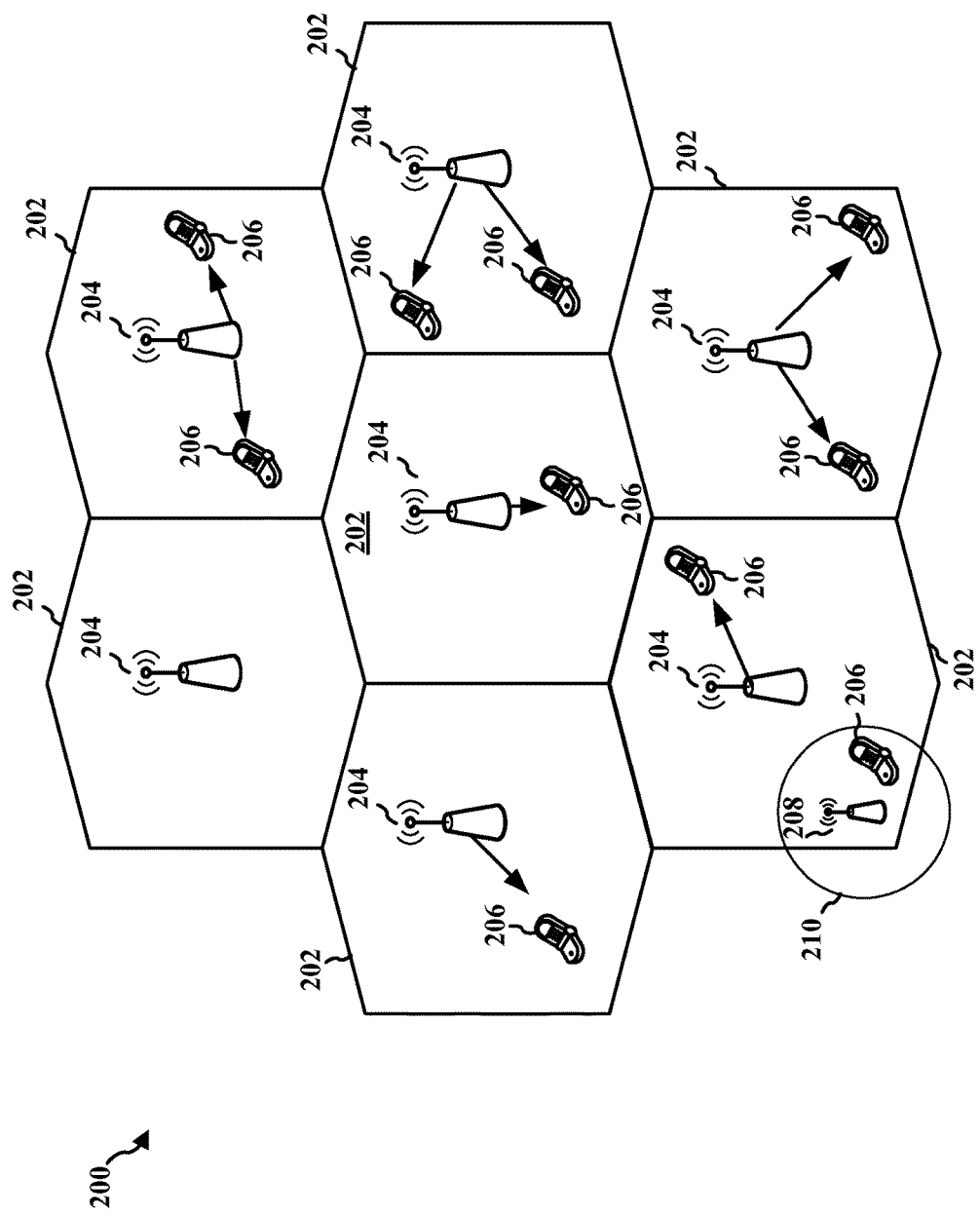
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
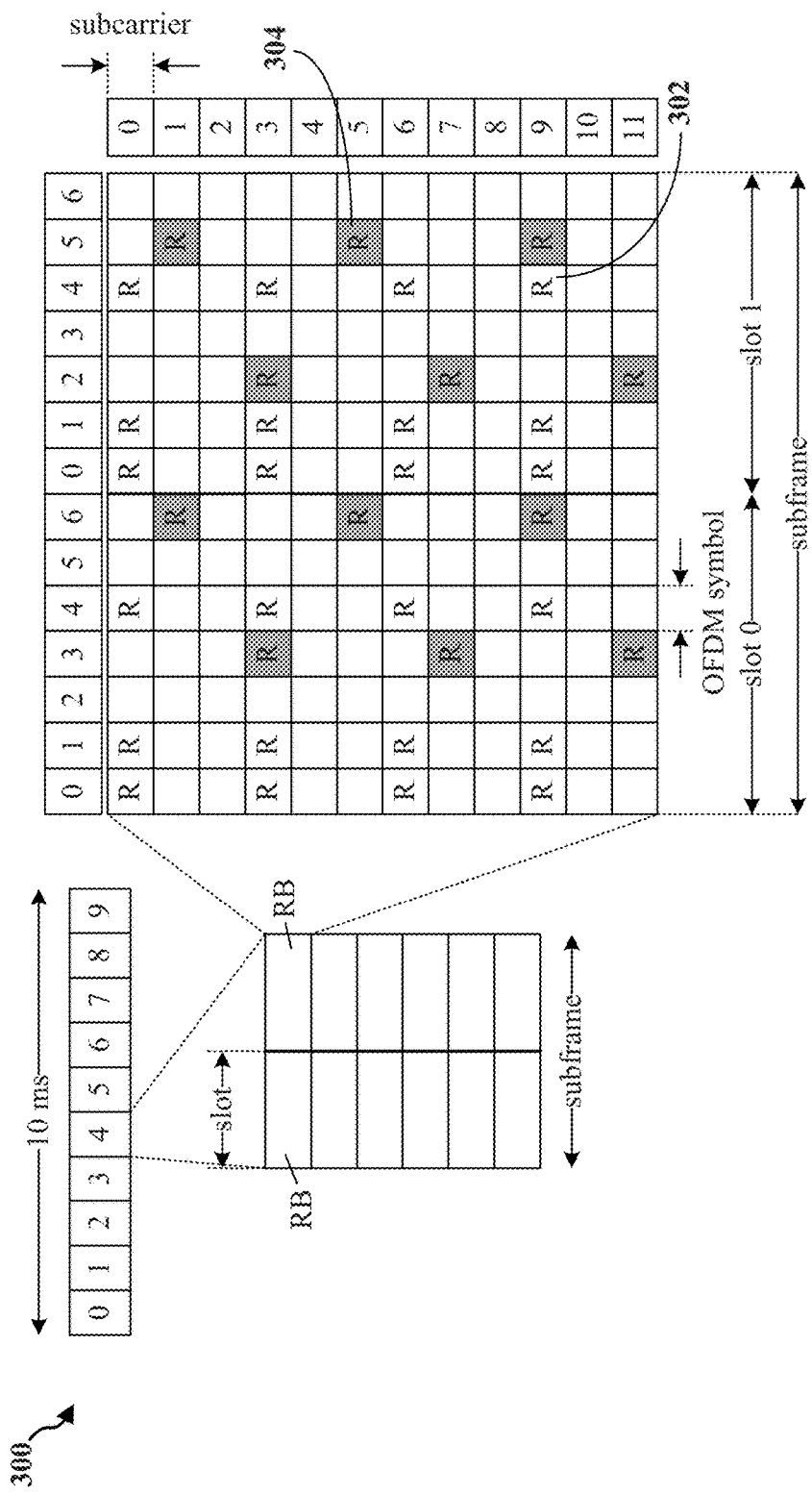
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
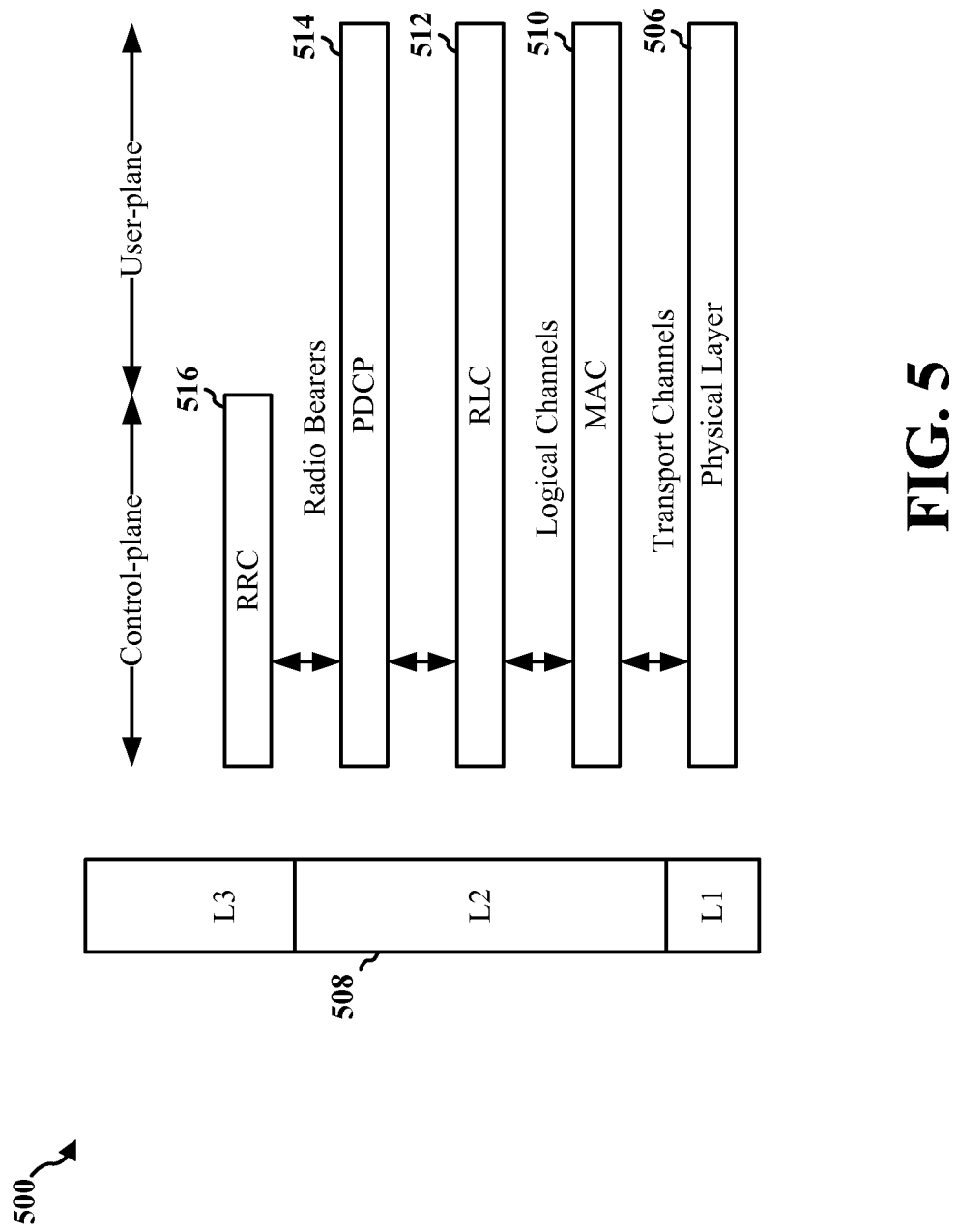
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
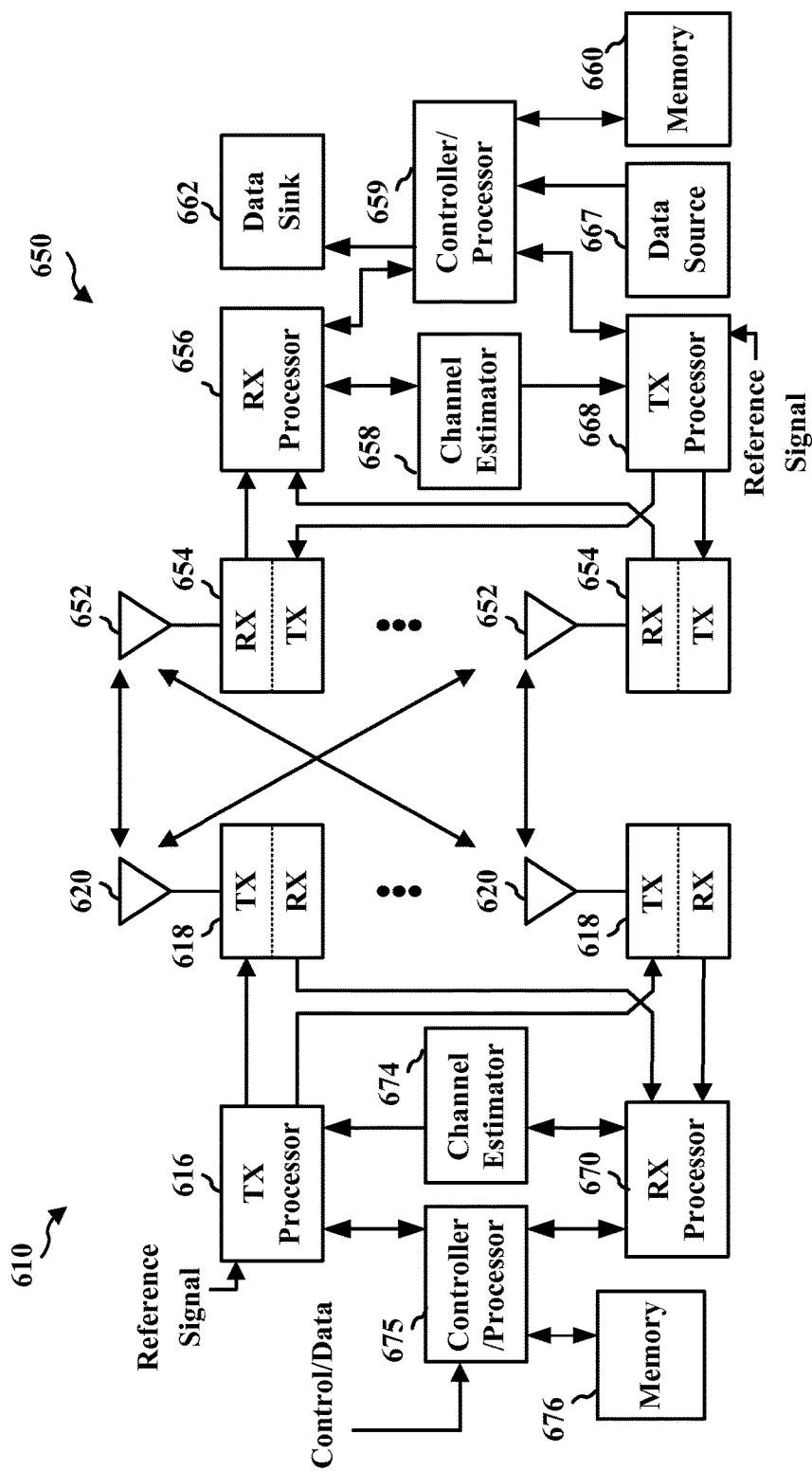
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
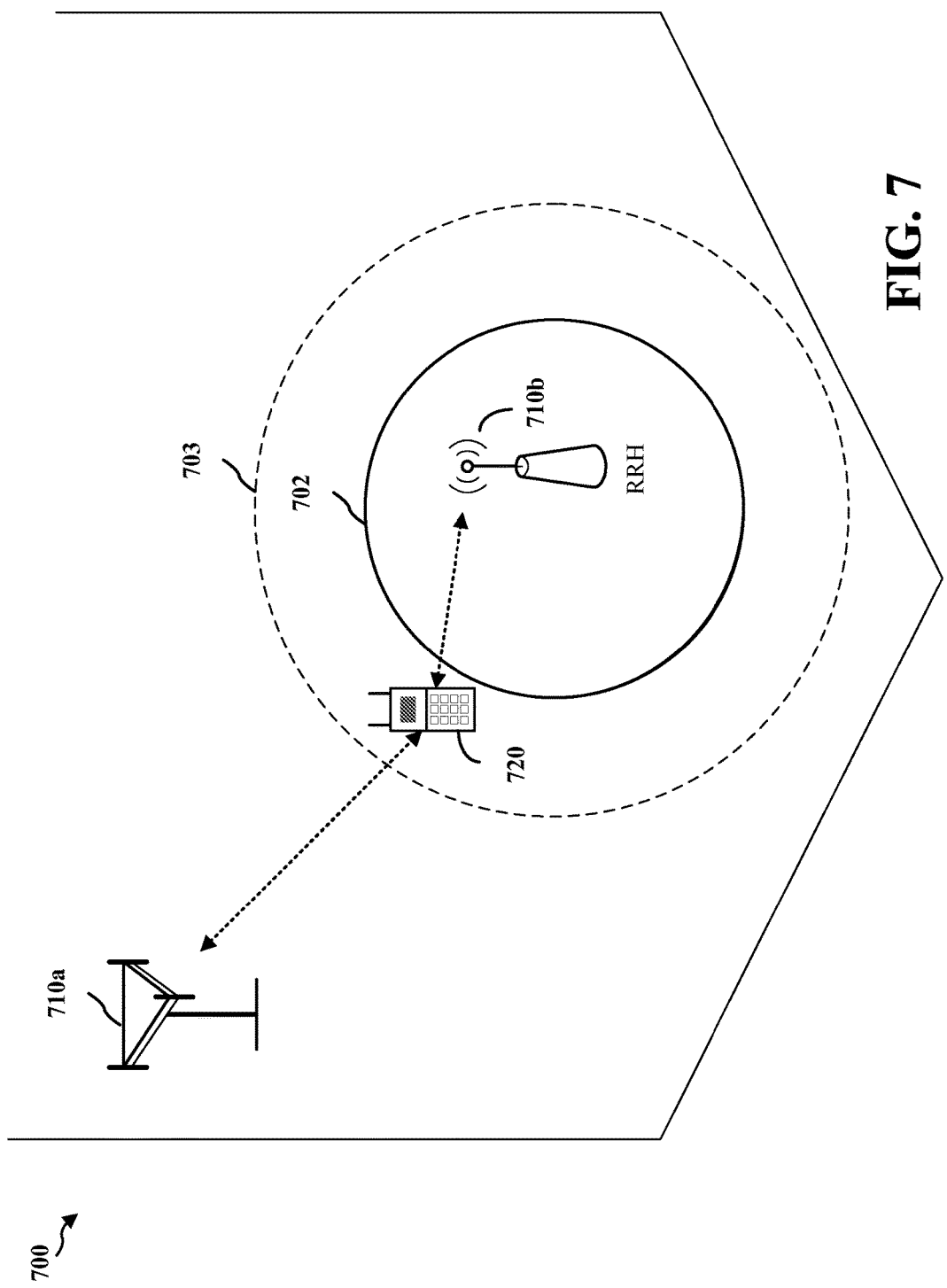
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination between the RRH 710b and the macro eNB 710a and through interference cancelation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

To schedule a transmission to a UE, an eNB predicts at what rate (e.g., modulation and coding scheme (MCS)/rank) to schedule the transmission. An optimal choice may depend on current channel and interference conditions. To aid in the prediction process, the eNB may request the UE to report information, such as rank, channel quality information (CQI), etc. This provides the eNB with an idea of what rate to schedule the transmission to the UE.

Typical eNB operation may involve obtaining feedback from the UE regarding a signal-to-noise ratio (SNR) that can be supported (e.g., via a CQI report), applying a backoff to the SNR, and selecting an MCS after the backoff is applied. The eNB may set a HARQ termination target, such as allowing 10% of transmissions to fail in the first transmission. To achieve the target, for every successful transmission the eNB may decrease the backoff by X dB, and for every failed transmission the eNB may increase the backoff by 10X dB, wherein X is a backoff step size. The eNB may learn of transmission success/failure through ACK/NACK feedback from the UE.

The approach described above works well in scenarios where an interference profile is fairly stable, and a rate prediction loop primarily deals with variations in channel conditions. However, when bursty interference is present, performance may be significantly degraded. For example, a scenario where interference causes the SNR to vary between two values A and B (A>B) may be considered. If the interference profile is known at the eNB, then a rate close to $C(A)F(A)+C(B)F(B)$ may be achieved, where $C(x)$ and $F(x)$ is the capacity and frequency corresponding to the SNR of x, respectively. Capacity may be an increasing function of SNR. If the interference profile is not known at the eNB, using the rate prediction loop, a rate achieved may only be close to $C(B)$ because transmitting above the rate $C(B)$ may on average lead to an error rate of at least $F(B)$, which is higher than the HARQ termination target.

In scenarios where the bursty interference affects only a subset of subframes (known previously by the eNB), having a separate CQI and a separate rate prediction loop for the subframes that do not see the interference and the subframes that do see the interference may mitigate loss. However, the problem is not completely resolved, especially for cases where any of the subframes may see the interference, or when the eNB is not aware of the subframes that can see the interference.

In an aspect, scenarios where bursty interference is present may include: 1) UE-UE interference; 2) heterogeneous networks with range expansion; 3) partial loading; and 4) coexistence with other technologies, for example. In the scenario involving UE-UE interference, operators in neighboring LTE TDD carriers may use different TDD configurations. UEs of an operator may see significant interference on downlink subframes that are uplink subframes of a neighboring operator if a UE of the neighboring operator is nearby. The interference may be bursty because the interference depends on whether the neighboring UE is transmitting. Also, the interference may only impact a subset of subframes since downlink subframes of the neighboring operator are not impacted. The eNB may know of the subframes which can see, and cannot see, the interference if the eNB is aware of the TDD configuration of the neighboring operator.

In the scenario involving heterogeneous networks with range expansion, some subframes are cleared by a macro cell and reserved exclusively for use by pico cells for range expansion. Other subframes may or may not be used by the macro cell, thus creating bursty interference for pico cell UEs. Here, a pico cell may be aware of the clean subframes. Rate prediction enhancements may help improve performance on the unclean subframes.

In the scenario involving partial loading, a neighboring cell may occasionally use a UE's downlink subframes when UE downlink traffic is low. Thus, the UE may see high interference when the neighboring cell is active and low interference when the neighboring cell is inactive.

In the scenario involving coexistence with other technologies, the UE may have multiple capabilities, such as Bluetooth, LTE, and Wi-Fi, for example. Moreover, all of these capabilities may be active at the same time. Thus, the active multiple capabilities crossing different technologies, may cause interference with each other. The interference may be bursty because the interference depends on the traffic conditions of each technology.

In an aspect, when the UE receives a packet from the eNB, the UE may send a positive acknowledgment (ACK) to the eNB when the UE completely decodes the packet based on the MCS determined for the packet by the eNB. When the UE is not able to completely decode the packet, the UE may send a negative acknowledgment (NACK) to the eNB. Based on ACK or NACK, the eNB is informed of whether the UE has completely decoded the transmitted packet, and may retransmit the packet accordingly. However, although ACK/NACK may be received by the eNB, when the UE does not completely decode the transmitted packet, the eNB is still unaware of any specific additional information needed by the UE for completely decoding the packet. Accordingly, a mechanism is desired for informing the eNB of additional information needed by the UE for decoding a packet transmitted from the eNB.

The additional information reported to the eNB may be a channel and/or interference condition related to a currently transmitted packet or a previously transmitted packet (e.g., SNR). Alternatively, the additional information reported to the eNB may be an amount of the packet decoded during the initial attempt to decode. Upon the eNB receiving the additional information from the UE, the eNB may optimize the packet by assigning a different MCS to the packet according to the received information. Thereafter, the eNB may retransmit the optimized packet to the UE.

In an aspect, the additional information reported to the eNB may be referred to as data CQI (DCQI). Hence, the UE may report the DCQI corresponding to allocated data in addition to ACK/NACK. A DCQI report may correspond to resource blocks on which data is allocated and may correspond to a scheme that is used for the data transmission. The DCQI may correspond to a worst CQI seen by different code blocks. The DCQI may be configured per UE using UE-specific signaling, or be enabled for a cell using cell-specific signaling. DCQI reporting may be enabled for UEs seeing, or expecting to see, bursty interference. The DCQI may be enabled/disabled by an RRC configuration message, or enabled more dynamically by being included in a downlink grant. The DCQI may be triggered when a packet is not completely decoded; otherwise, if completely decoded, ACK may be sent. The transmission of DCQI may be limited to a subset of downlink subframes (e.g., subframes that are likely to see bursty interference, or one of a set of subframes used with dual CQI). The DCQI corresponding to a downlink subframe may be sent on an uplink subframe that would have been used to send ACK. DCQI reports may be sent in addition to dual CQI/regular CQI reports. Moreover, one DCQI report may be sent for multiple subframes.

In an aspect, a DCQI report differs from a regular CQI report. For example, regular CQI is generally transmitted from the UE either periodically or aperiodically according to a schedule determined by the eNB. In contrast, DCQI may be dynamically transmitted from the UE upon the eNB transmitting a packet to the UE, and the UE failing to completely decode the packet. In another example, regular CQI may be initiated by the eNB. That is, the UE sends a regular CQI report to the eNB only after the eNB requests such report. In contrast, the UE may immediately generate and send a DCQI report to the eNB upon receiving a packet from the eNB.

In a further example of the difference between the DCQI report and the regular CQI report, regular CQI may be configured as either "wideband" (e.g., one CQI value is reported for an entire bandwidth), or "sub-band" (e.g., the UE reports a CQI value for an entire bandwidth, and a CQI value for each sub-band). The particular sub-bands for which the sub-band CQI value is reported may depend on a system bandwidth, and whether a sub-band CQI mode is configured by the eNB (i.e., "eNB configured") or selected by the UE (i.e., "UE-selected"). Hence, regular CQI reports may not be specific to the actual resource blocks allocated for a current PDSCH transmission. On the other hand, DCQI may be made specific to the actual resource blocks currently being used.

In an example operation, a scenario may be considered where certain subframes experience no bursty interference (i.e., good subframes), certain subframes experience bursty interference (i.e., bad subframes), and dual CQI reporting is utilized. Here, the eNB may send a packet at a rate corresponding to a good subframe. Upon receipt, the UE may attempt to decode the packet. If the packet is completely decoded, the UE sends ACK to the eNB. If the packet is not completely decoded, based on an actual interference seen with respect to the packet, the UE can determine how much additional information is needed to completely decode the packet. The UE may then convey the additional information to the eNB. Thereafter, the eNB may optimize a retransmission of the packet to exactly what is needed according to the additional information. Notably, the above-described operation makes it easier for the eNB to use a rate prediction loop because the eNB is made aware of the interference profile related to the transmitted packet.

In a further aspect, in scenarios with bursty interference, where interference leads to a packet being almost completely lost, the UE may cause the eNB to believe that the packet transmission was completely lost (e.g., discontinuous transmission (DTX) on uplink). Here, the UE does not send an ACK or NACK on the uplink. Thus, the eNB may determine that neither ACK nor NACK was sent, and will assume that PDCCH was not decoded by the UE, and hence an entire downlink transmission was lost. Due to this, the eNB may update a rate control loop/change power control for control channels. Outer-loop adjustments may not be made for sporadic interference.

In another aspect, a signal may be sent from the UE indicating to the eNB that high interference was observed on a particular subframe. The eNB may then avoid outer-loop adjustments for such subframes. Further, a signal may be sent from the UE to the eNB indicating an interference profile (e.g., time/frequency selectivity, level of interference, etc.) in order to help mitigate issues due to bursty interference.

Figure 8:
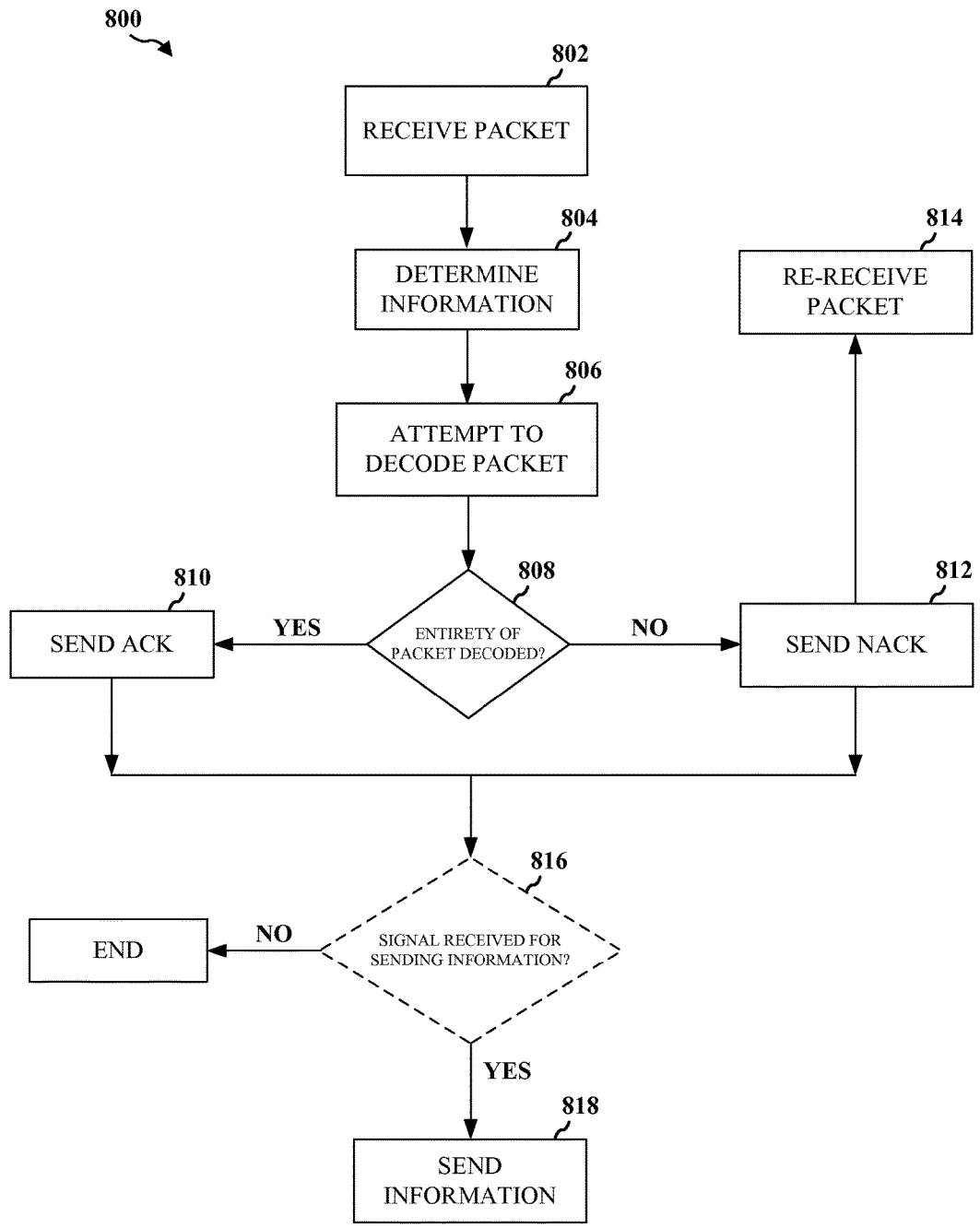
FIG. 8 is a flow chart of a method of wireless communication.

FIG. 8 is a flow chart 800 of a method of wireless communication. The method may be performed by a UE. At step 802, the UE may receive a packet from a base station. The packet may have a first modulation and coding scheme (MCS) determined by the base station.

At step 804, the UE may determine information to provide to the base station. The information may include channel quality information (CQI) relating to a channel condition and/or interference condition corresponding to time-frequency resources allocated for the received packet. Moreover, the information may relate to one or more time-frequency resources in which the UE receives the packet or a previously received packet. The information may also relate to one or more subframes in which the UE expects interference.

At step 806, the UE may attempt to decode the packet received at step 802. At step 808, the UE may determine whether an entirety of the packet may be decoded. If the entirety of the packet is decoded successfully, the UE may proceed to step 810, and send ACK to the base station. In an aspect, if the entirety of the packet is decoded successfully, then the sending of the information performed at step 818 (described below) may be dynamically disabled.

At step 812, when the entirety of the packet is not decoded during the attempt to decode the UE may send NACK to the base station. Accordingly, the information to be sent to the base station may further include an amount of the packet decoded during the attempt to decode. Thereafter, the UE may proceed to step 814 and step 816.

At step 814, when the UE sends NACK to the base station, the UE may re-receive the packet from the base station. The re-received packet may have a second MCS determined according to the information sent to the base station at step 818 (described below).

At step 816, after the UE sends ACK (step 810) or NACK (step 812), the UE may determine if a signal was received from the base station for enabling/disabling the UE from sending the information. The signal may be a UE-specific signal (e.g., a downlink grant) and/or a cell-specific signal. In an aspect, the signal may be an enabling signal dynamically enabling the sending of the information. Alternatively, the signal may be a disabling signal dynamically disabling the sending of the information. If the signal for enabling the sending of the information was not received, or if a signal for disabling the sending of the information was received, then the UE may end the operation. However, if the signal for enabling the sending of the information was received, the UE may proceed to step 818. In accordance with the method, step 816 may be optional. Hence, the UE may proceed from steps 810 or 812 to step 806 directly without performing step 816.

At step 818, the UE sends the information to the base station. The information may be sent to the base station on uplink time-frequency resources allocated for sending acknowledgment/negative acknowledgment (ACK/NACK) feedback. The information may be sent in addition to a regular CQI report configured for a sub-band. The base station may use the information for MCS determination/rate prediction.

Figure 9:
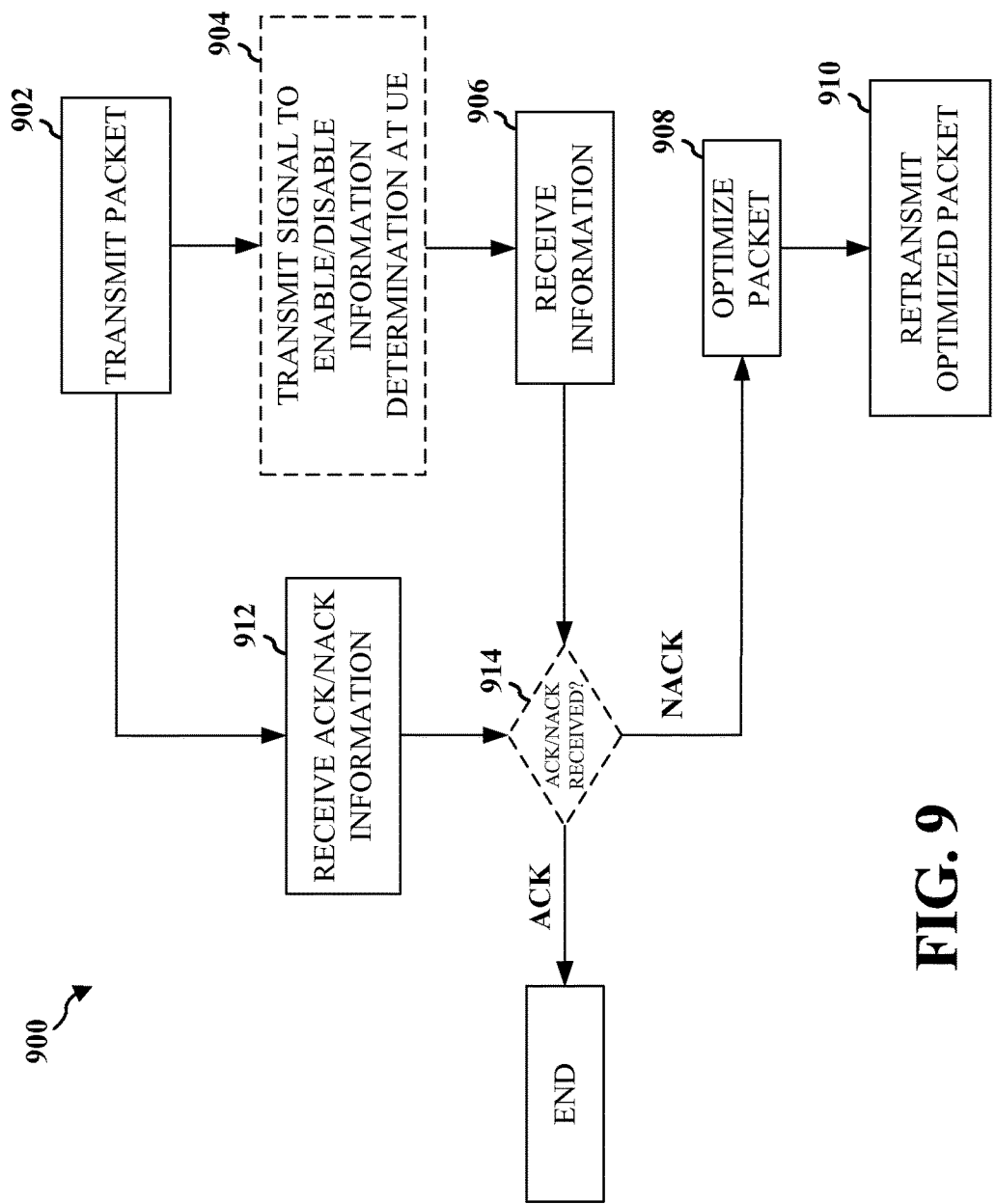
FIG. 9 is a flow chart of a method of wireless communication.

FIG. 9 is a flow chart 900 of a method of wireless communication. The method may be performed by an eNB. At step 902, the eNB may transmit a packet to a user equipment (UE). The packet may have a first modulation and coding scheme (MCS) determined by the eNB. At step 912, if the UE decodes the transmitted packet in its entirety, the eNB may receive ACK from the UE. Alternatively, if the UE does not decode the transmitted packet in its entirety, the eNB may receive NACK from the UE.

At step 904, the eNB may transmit a signal to the UE. Here, the signal may enable the UE to determine information to provide to the eNB. The signal may be a UE-specific signal (e.g., a downlink grant) or a cell-specific signal. In an aspect, the signal may be an enabling signal dynamically enabling the UE to determine and/or send the information. Alternatively, the signal may be a disabling signal dynamically disabling the UE from determining and/or sending the information. In accordance with the method, step 904 may be optional. Hence, the eNB may proceed from step 902 to step 906 directly without performing step 904.

At step 906, the eNB receives the information from the UE. The information may be received on uplink time-frequency resources allocated for receiving ACK/NACK feedback. Moreover, the information may be received in addition to a regular CQI report configured for a sub-band. In an aspect, if the transmitted packet is decoded successfully at the UE, the eNB may dynamically disable reception of the information.

The information may be used by the eNB for MCS determination/rate prediction. The information may include channel quality information (CQI) relating to a channel condition and/or interference condition corresponding to time-frequency resources allocated for the transmitted packet. The information may also include an amount of the packet decoded at the UE. The information may relate to one or more time-frequency resources in which the packet or a previously transmitted packet is transmitted. The information may also relate to one or more subframes in which interference is expected at the UE.

In an aspect, the eNB may receive the information from the UE when the entirety of the packet is decoded at the UE. The information may be received in addition to, or in place of, the ACK received at step 912. The information may be used by the eNB for MCS determination/rate prediction. Thereafter, the eNB proceeds to step 914.

At step 914, the eNB determines if ACK or NACK was received from the UE. If ACK was received, then the eNB may end the operation. However, if NACK was received, then the eNB may proceed to step 908. At step 908, the eNB optimizes the packet to have a second MCS according to the information received from the UE. Thereafter, at step 910, the eNB retransmits the optimized packet to the UE.

Figure 10:
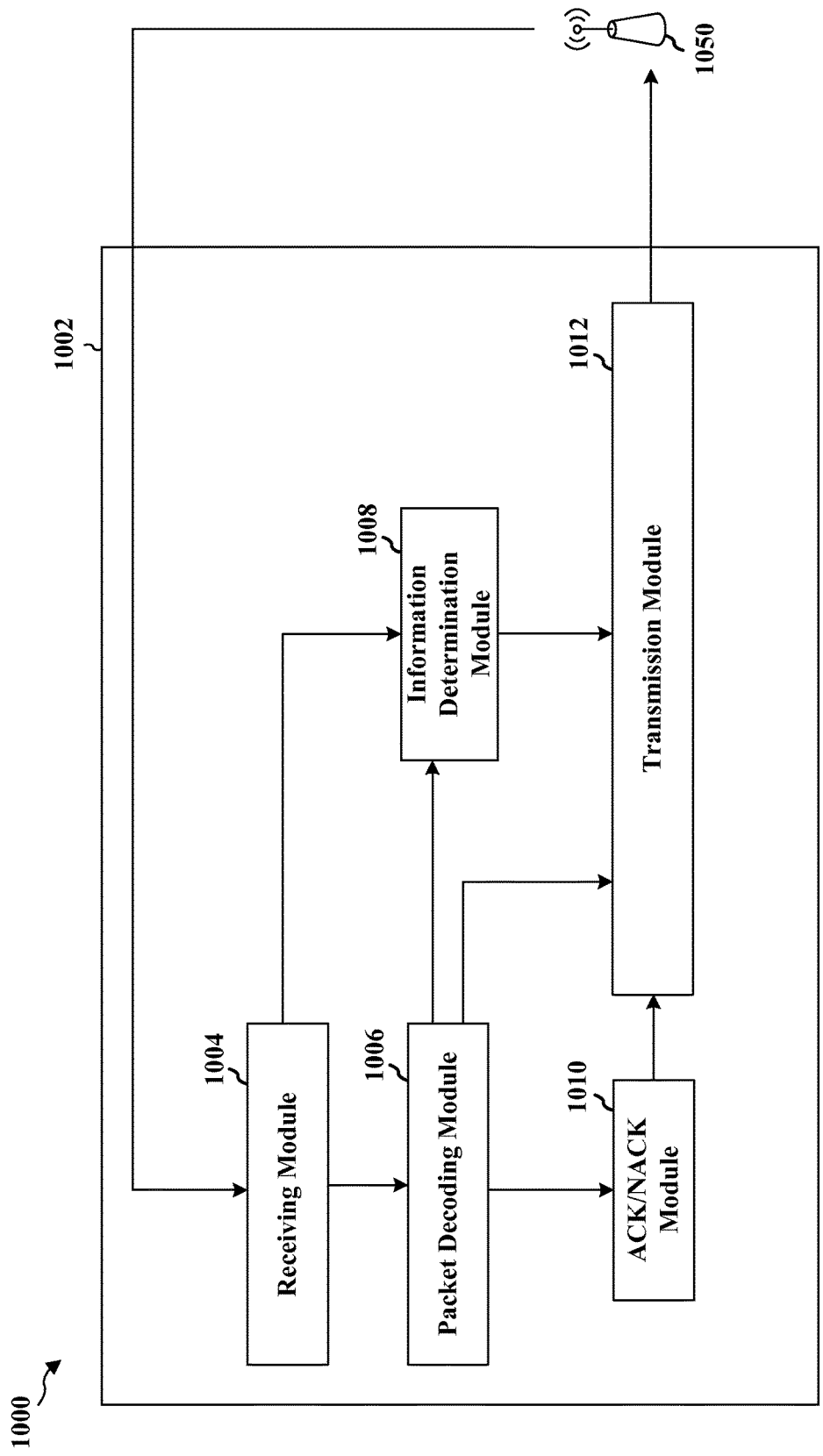
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a UE. The apparatus includes a receiving module 1004, a packet decoding module 1006, an information determination module 1008, an ACK/NACK module 1010, and a transmission module 1012.

The receiving module 1004 may receive a packet from a base station 1050. The packet may have a first modulation and coding scheme (MCS) determined by the base station 1050.

The information determination module 1008 may determine information to provide to the base station 1050. The information may include channel quality information (CQI) relating to a channel condition and/or interference condition corresponding to time-frequency resources allocated for the received packet. Moreover, the information may relate to one or more time-frequency resources in which the receiving module 1004 receives the packet or a previously received packet. The information may also relate to one or more subframes in which the receiving module 1004 expects interference.

The packet decoding module 1006 may attempt to decode a packet received by the receiving module 1004. The packet decoding module 1006 may determine whether an entirety of the packet may be decoded. If the entirety of the packet is decoded successfully, the ACK/NACK module 1010 may send ACK (via the transmission module 1012) to the base station 1050. Moreover, if the entirety of the packet is decoded successfully, the information determination module 1008 may be dynamically disabled from sending determined information to the base station 1050.

When the entirety of the packet is not decoded by the packet decoding module 1006 during the attempt to decode, the ACK/NACK module 1010 may send NACK to the base station 1050. Accordingly, the information to be sent to the base station 1050 may further include an amount of the packet decoded during the attempt to decode.

When the ACK/NACK module 1010 sends NACK to the base station 1050, the receiving module 1004 may re-receive the packet from the base station 1050. The re-received packet may have a second MCS determined according to information sent to the base station 1050 by the information determination module 1008.

After the ACK/NACK module 1010 sends ACK or NACK to the base station 1050, the information determination module 1008 may determine if a signal was received (via the receiving module 1004) from the base station 1050 for enabling/disabling the information determination module 1008 to determine and/or send (via the transmission module 1012) information. The signal may be a UE-specific signal (e.g., a downlink grant) and/or a cell-specific signal. In an aspect, the signal may be an enabling signal dynamically enabling the determining and/or sending of the information. Alternatively, the signal may be a disabling signal dynamically disabling the determining and/or sending of the information. If the signal for enabling the sending of the information was not received, or if a signal for disabling the sending of the information was received, then the information determination module 1008 may end the operation. However, if the signal for enabling the sending of the information was received, the information determination module 1008 may proceed with the operation. In an aspect, the information determination module 1008 may opt not to determine if the signal for enabling/disabling the information determination and/or sending was received. Hence, the information determination module 1008 may proceed with sending the information after the ACK/NACK module 1010 sends ACK or NACK to the base station 1050.

The information determination module 1008 sends (via the transmission module 1012) the information to the base station 1050. The information may be sent to the base station 1050 on uplink time-frequency resources allocated for sending ACK/NACK feedback. The information may be sent in addition to a regular CQI report configured for a sub-band. The base station 1050 may use the information for MCS determination/rate prediction.

The apparatus may include additional modules that perform each of the steps of the algorithm in the aforementioned flow chart of FIG. 8. As such, each step in the aforementioned flow chart of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
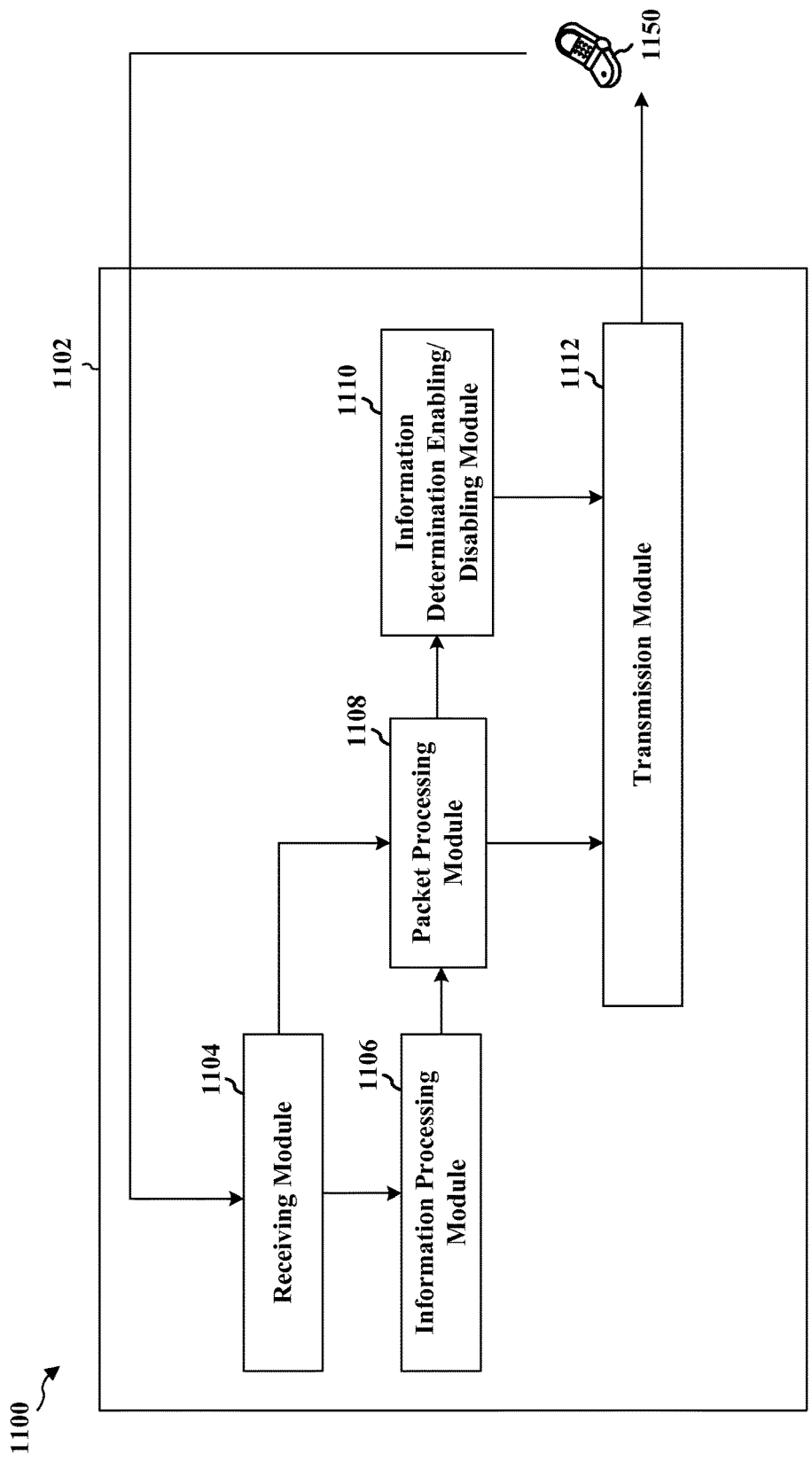
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus may be an eNB. The apparatus includes a receiving module 1104, an information processing module 1106, a packet processing module 1108, an information determination enabling/disabling module 1110, and a transmission module 1112.

The packet processing module 1108 may transmit a packet to a UE 1150. The packet may have a first modulation and coding scheme (MCS) determined by the packet processing module 1108. If the UE 1150 decodes the transmitted packet in its entirety, the packet processing module 1108 may receive ACK (via the receiving module 1104) from the UE 1150. Alternatively, if the UE 1150 does not decode the transmitted packet in its entirety, the packet processing module 1108 may receive NACK (via the receiving module 1104) from the UE 1150.

The information determination enabling/disabling module 1110 may transmit a signal to the UE 1150. Here, the signal may enable the UE 1150 to determine information to provide to the apparatus 1102. The signal may be a UE-specific signal (e.g., a downlink grant) or a cell-specific signal. In an aspect, the signal may be an enabling signal dynamically enabling the UE 1150 to determine and/or send the information. Alternatively, the signal may be a disabling signal dynamically disabling the UE 1150 from determining and/or sending the information. In an aspect, the information determination enabling/disabling module 1110 may opt not to send the signal for enabling/disabling information determination. Hence, the modules of the apparatus 1102 may proceed with further operations without sending the signal.

The information processing module 1106 receives the information from the UE 1150. The information may be received on uplink time-frequency resources allocated for receiving ACK/NACK feedback. Moreover, the information may be received in addition to a regular CQI report configured for a sub-band. In an aspect, if the transmitted packet is decoded successfully at the UE 1150, the information processing module 1106 may dynamically disable reception of the information.

The information may be used by the packet processing module 1108 for MCS determination/rate prediction. The information may include channel quality information (CQI) relating to a channel condition and/or interference condition corresponding to time-frequency resources allocated for the transmitted packet. The information may also include an amount of the packet decoded at the UE 1150. The information may relate to one or more time-frequency resources in which the packet or a previously transmitted packet is transmitted. The information may also relate to one or more subframes in which interference is expected at the UE 1150.

In an aspect, the information processing module 1106 may receive the information from the UE 1150 when the entirety of the packet is decoded at the UE 1150. The information may be received in addition to, or in place of, the ACK received by the packet processing module 1108. The information may be used by the packet processing module 1108 for MCS determination/rate prediction.

The packet processing module 1108 determines if ACK or NACK was received from the UE 1150. If ACK was received, then the packet processing module 1108 may end the operation. However, if NACK was received, the packet processing module 1108 optimizes the packet to have a second MCS according to the information received from the UE 1150. Thereafter, the packet processing module 1108 retransmits (via the transmission module 1112) the optimized packet to the UE 1150.

The apparatus may include additional modules that perform each of the steps of the algorithm in the aforementioned flow chart of FIG. 9. As such, each step in the aforementioned flow chart of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
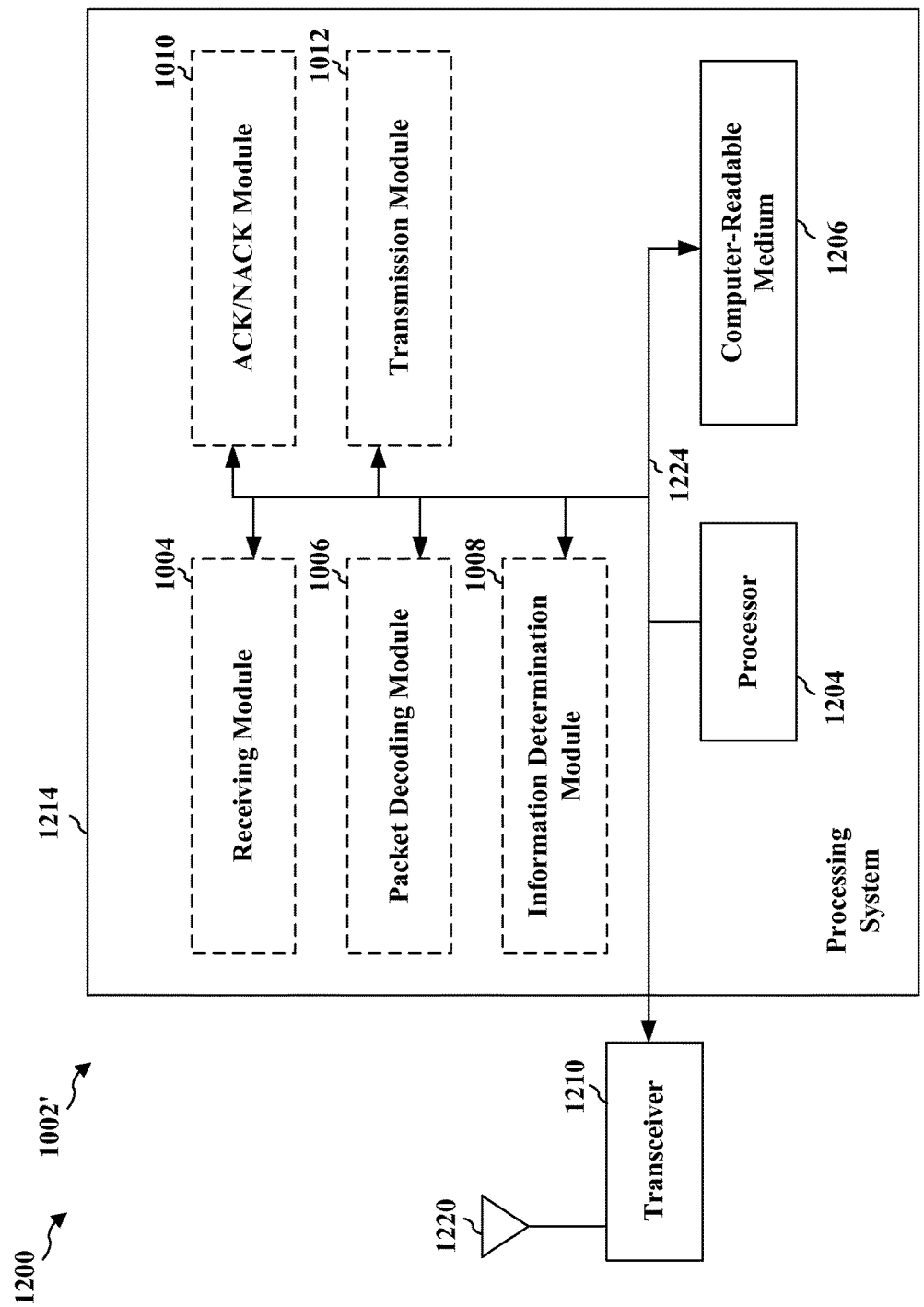
FIG. 12 is a diagram illustrating an example of a hardware implementation for an apparatus employing a processing system.

FIG. 12 is a diagram 1200 illustrating an example of a hardware implementation for an apparatus 1002' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1004, 1006, 1008, 1010, 1012 and the computer-readable medium 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the receiving module 1004. In addition, the transceiver 1210 receives information from the processing system 1214, specifically the transmission module 1012, and based on the received information, generates a signal to be applied to the one or more antennas 1220. The processing system 1214 includes a processor 1204 coupled to a computer-readable medium 1206. The processor 1204 is responsible for general processing, including the execution of software stored on the computer-readable medium 1206. The software, when executed by the processor 1204, causes the processing system 1214 to perform the various functions described supra for any particular apparatus. The computer-readable medium 1206 may also be used for storing data that is manipulated by the processor 1204 when executing software. The processing system further includes at least one of the modules 1004, 1006, 1008, 1010, and 1012. The modules may be software modules running in the processor 1204, resident/stored in the computer readable medium 1206, one or more hardware modules coupled to the processor 1204, or some combination thereof. The processing system 1214 may be a component of the UE 650 and may include the memory 660 and/or at least one of the TX processor 668, the RX processor 656, and the controller/processor 659.

In one configuration, the apparatus 1002/1002' for wireless communication includes means for receiving a packet from a base station, the packet having a first modulation and coding scheme (MCS), means for determining information to provide to the base station, wherein the information comprises channel quality information (CQI) relating to a channel condition and/or interference condition corresponding to time-frequency resources allocated for the received packet, means for sending the information to the base station, means for attempting to decode the packet, means for sending an acknowledgment (ACK) to the base station when an entirety of the packet is decoded during the attempt to decode, means for sending a negative acknowledgment (NACK) to the base station when an entirety of the packet is not decoded during the attempt to decode, wherein the information further comprises an amount of the packet decoded during the attempt to decode, means for re-receiving the packet from the base station, the re-received packet having a second MCS according to the information sent to the base station, and means for receiving a signal from the base station for enabling or disabling the means for determining and means for sending the information.

The aforementioned means may be one or more of the aforementioned modules of the apparatus 1002 and/or the processing system 1214 of the apparatus 1002' configured to perform the functions recited by the aforementioned means. As described supra, the processing system 1214 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 13:
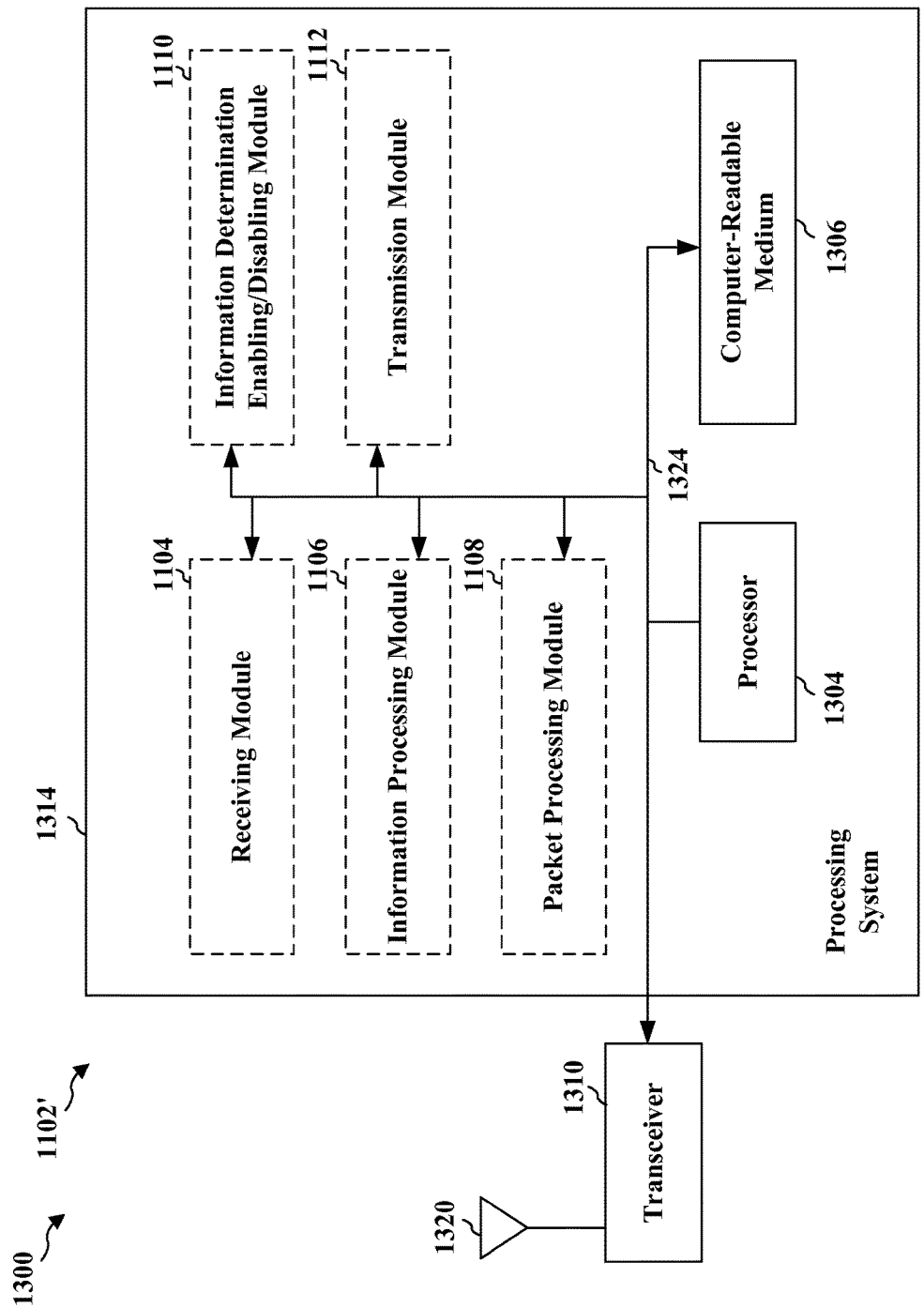
FIG. 13 is a diagram illustrating an example of a hardware implementation for an apparatus employing a processing system.

FIG. 13 is a diagram 1300 illustrating an example of a hardware implementation for an apparatus 1102' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1104, 1106, 1108, 1110, 1112 and the computer-readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the receiving module 1104. In addition, the transceiver 1310 receives information from the processing system 1314, specifically the transmission module 1112, and based on the received information, generates a signal to be applied to the one or more antennas 1320. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes at least one of the modules 1104, 1106, 1108, 1110, and 1112. The modules may be software modules running in the processor 1304, resident/stored in the computer readable medium 1306, one or more hardware modules coupled to the processor 1304, or some combination thereof. The processing system 1314 may be a component of the eNB 610 and may include the memory 676 and/or at least one of the TX processor 616, the RX processor 670, and the controller/processor 675.

In one configuration, the apparatus 1102/1102' for wireless communication includes means for transmitting a packet to a user equipment (UE), the packet having a first modulation and coding scheme (MCS), means for receiving information from the UE, wherein the information comprises channel quality information (CQI) relating to a channel condition and/or interference condition corresponding to time-frequency resources allocated for the transmitted packet, means for optimizing the packet to have a second MCS according to the received information, means for retransmitting the optimized packet to the UE, means for receiving an acknowledgment (ACK) from the UE when an entirety of the packet is decoded at the UE, means for receiving a negative acknowledgment (NACK) from the UE when an entirety of the packet is not decoded at the UE, and means for transmitting a signal to the UE for enabling or disabling the UE to determine and send the information.

The aforementioned means may be one or more of the aforementioned modules of the apparatus 1102 and/or the processing system 1314 of the apparatus 1102' configured to perform the functions recited by the aforementioned means. As described supra, the processing system 1314 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Moreover, as used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   receiving a first packet from a base station, the first packet having a first modulation and coding scheme (MCS);
   attempting to decode the first packet;
   determining information to provide to the base station only if the first packet fails to be decoded, wherein the information comprises channel quality information (CQI) relating to an interference condition corresponding to time-frequency resources allocated for the received first packet, a data channel quality information (DCQI) report corresponding to time-frequency resource blocks on which data is allocated;
   sending the information to the base station; and
   receiving a second packet from the base station, the second packet being an optimized version of the first packet and having a second MCS, the second MCS is different from the first MCS and is determined based at least in part on the determined information provided to the base station.

2. The method of claim 1, further comprising sending an acknowledgment (ACK) to the base station when an entirety of the first packet is decoded during the attempt to decode.

3. The method of claim 1, further comprising sending a negative acknowledgment (NACK) to the base station when an entirety of the first packet is not decoded during the attempt to decode.

4. The method of claim 3, wherein the information further comprises an amount of the first packet decoded during the attempt to decode.

5. The method of claim 1, wherein the information relates to one or more time-frequency resources in which the first packet or a previously received packet is received.

6. The method of claim 1, wherein the information relates to one or more subframes in which interference is expected.

7. The method of claim 1, further comprising receiving a signal from the base station for enabling or disabling the determining and the sending of the information.

8. The method of claim 7, wherein the signal is at least one of a user equipment (UE)-specific signal or a cell-specific signal.

9. The method of claim 8, wherein the UE-specific signal is a downlink grant.

10. The method of claim 7, wherein the received signal dynamically enables or disables the determining and the sending of the information.

11. The method of claim 1, wherein the sending of the information is dynamically disabled if the first packet is decoded successfully.

12. The method of claim 1, wherein the information is sent to the base station on uplink time-frequency resources allocated for sending acknowledgment/negative acknowledgment (ACK/NACK) feedback.

13. The method of claim 1, wherein the information is sent in addition to a regular CQI report configured for a sub-band.

14. A method of wireless communication, comprising:
    transmitting a packet to a user equipment (UE), the packet having a first modulation and coding scheme (MCS);
    receiving information from the UE only if the UE fails to decode the packet, wherein the information comprises channel quality information (CQI) relating to an interference condition corresponding to time-frequency resources allocated for the transmitted packet, a data channel quality information (DCQI) report corresponding to time-frequency resource blocks on which data is allocated;
    optimizing the packet, based on the received information, to have a second MCS, the second MCS being different from the first MCS; and
    retransmitting the optimized packet to the UE.

15. The method of claim 14, wherein the information further comprises an amount of the packet decoded at the UE.

16. The method of claim 14, further comprising receiving an acknowledgment (ACK) from the UE when an entirety of the packet is decoded at the UE.

17. The method of claim 14, further comprising receiving a negative acknowledgment (NACK) from the UE when an entirety of the packet is not decoded at the UE.

18. The method of claim 14, wherein the information relates to one or more time-frequency resources in which the packet or a previously transmitted packet is transmitted.

19. The method of claim 14, wherein the information relates to one or more subframes in which interference is expected at the UE.

20. The method of claim 14, further comprising transmitting a signal to the UE for enabling or disabling the UE to determine and send the information.

21. The method of claim 20, wherein the signal is at least one of a UE-specific signal or a cell-specific signal.

22. The method of claim 21, wherein the UE-specific signal is a downlink grant.

23. The method of claim 20, wherein the transmitted signal dynamically enables or disables the UE to determine and send the information.

24. The method of claim 14, wherein the receiving of the information is dynamically disabled if the packet is decoded successfully at the UE.

25. The method of claim 14, wherein the information is received on uplink time-frequency resources allocated for receiving acknowledgment/negative acknowledgment (ACK/NACK) feedback.

26. The method of claim 14, wherein the information is received in addition to a regular CQI report configured for a sub-band.

27. An apparatus for wireless communication, comprising:
   means for receiving a first packet from a base station, the first packet having a first modulation and coding scheme (MCS);
   means for attempting to decode the first packet;
   means for determining information to provide to the base station only if the first packet fails to be decoded, wherein the information comprises channel quality information (CQI) relating to an interference condition corresponding to time-frequency resources allocated for the received first packet, and a data channel quality information (DCQI) report corresponding to time-frequency resource blocks on which data is allocated;
   means for sending the information to the base station; and
   means for receiving a second packet from the base station, the second packet being an optimized version of the first packet and having a second MCS, the second MCS is different from the first MCS and is determined based at least in part on the determined information provided to the base station.

28. The apparatus of claim 27, further comprising means for sending an acknowledgment (ACK) to the base station when an entirety of the first packet is decoded during the attempt to decode.

29. The apparatus of claim 27, further comprising means for sending a negative acknowledgment (NACK) to the base station when an entirety of the first packet is not decoded during the attempt to decode.

30. The apparatus of claim 29, wherein the information further comprises an amount of the first packet decoded during the attempt to decode.

31. The apparatus of claim 27, wherein the information relates to one or more time-frequency resources in which the first packet or a previously received packet is received.

32. The apparatus of claim 27, wherein the information relates to one or more subframes in which interference is expected.

33. The apparatus of claim 27, further comprising means for receiving a signal from the base station for enabling or disabling the means for determining and the means for sending the information.

34. The apparatus of claim 33, wherein the signal is at least one of a user equipment (UE)-specific signal or a cell-specific signal.

35. The apparatus of claim 34, wherein the UE-specific signal is a downlink grant.

36. The apparatus of claim 33, wherein the received signal dynamically enables or disables the means for determining and the means for sending the information.

37. The apparatus of claim 27, wherein the means for sending the information is dynamically disabled if the first packet is decoded successfully.

38. The apparatus of claim 27, wherein the information is sent to the base station on uplink time-frequency resources allocated for sending acknowledgment/negative acknowledgment (ACK/NACK) feedback.

39. The apparatus of claim 27, wherein the information is sent in addition to a regular CQI report configured for a sub-band.

40. An apparatus for wireless communication, comprising:
   means for transmitting a packet to a user equipment (UE), the packet having a first modulation and coding scheme (MCS);
   means for receiving information from the UE only if the UE fails to decode the packet, wherein the information comprises channel quality information (CQI) relating to an interference condition corresponding to time-frequency resources allocated for the transmitted packet, and a data channel quality information (DCQI) report corresponding to time-frequency resource blocks on which data is allocated;
   means for optimizing the packet, based on the received information, to have a second MCS, the second MCS being different from the first MCS; and
   means for retransmitting the optimized packet to the UE.

41. The apparatus of claim 40, wherein the information further comprises an amount of the packet decoded at the UE.

42. The apparatus of claim 40, further comprising means for receiving an acknowledgment (ACK) from the UE when an entirety of the packet is decoded at the UE.

43. The apparatus of claim 40, further comprising means for receiving a negative acknowledgment (NACK) from the UE when an entirety of the packet is not decoded at the UE.

44. The apparatus of claim 40, wherein the information relates to one or more time-frequency resources in which the packet or a previously transmitted packet is transmitted.

45. The apparatus of claim 40, wherein the information relates to one or more subframes in which interference is expected at the UE.

46. The apparatus of claim 40, further comprising means for transmitting a signal to the UE for enabling or disabling the UE to determine and send the information.

47. The apparatus of claim 46, wherein the signal is at least one of a UE-specific signal or a cell-specific signal.

48. The apparatus of claim 47, wherein the UE-specific signal is a downlink grant.

49. The apparatus of claim 46, wherein the transmitted signal dynamically enables or disables the UE to determine and send the information.

50. The apparatus of claim 40, wherein the information is received on uplink time-frequency resources allocated for receiving acknowledgment/negative acknowledgment (ACK/NACK) feedback.

51. The apparatus of claim 40, wherein the information is received in addition to a regular CQI report configured for a sub-band.

52. An apparatus for wireless communication, comprising:
a memory; and
at least one processor coupled to the memory and configured to:
receive a first packet from a base station, the first packet having a first modulation and coding scheme (MCS);
attempt to decode the first packet;
determine information to provide to the base station only if the first packet fails to be decoded, wherein the information comprises channel quality information (CQI) relating to an interference condition corresponding to time-frequency resources allocated for the received first packet, and a data channel quality information (DCQI) report corresponding to time-frequency resource blocks on which data is allocated;
send the information to the base station; and
receive a second packet from the base station, the second packet being an optimized version of the first packet and having a second MCS, the second MCS is different from the first MCS and is determined based at least in part on the determined information provided to the base station.

53. The apparatus of claim 52, the at least one processor further configured to send an acknowledgment (ACK) to the base station when an entirety of the first packet is decoded during the attempt to decode.

54. The apparatus of claim 52, the at least one processor further configured to send a negative acknowledgment (NACK) to the base station when an entirety of the first packet is not decoded during the attempt to decode.

55. The apparatus of claim 54, wherein the information further comprises an amount of the first packet decoded during the attempt to decode.

56. The apparatus of claim 52, wherein the information relates to one or more time-frequency resources in which the first packet or a previously received packet is received.

57. The apparatus of claim 52, wherein the information relates to one or more subframes in which interference is expected.

58. The apparatus of claim 52, the at least one processor further configured to receive a signal from the base station for enabling or disabling the determining and the sending of the information.

59. The apparatus of claim 58, wherein the signal is at least one of a user equipment (UE)-specific signal or a cell-specific signal.

60. The apparatus of claim 59, wherein the UE-specific signal is a downlink grant.

61. The apparatus of claim 58, wherein the received signal dynamically enables or disables the determining and the sending of the information.

62. The apparatus of claim 52, wherein the at least one processor configured to dynamically disable the sending of the information if the first packet is decoded successfully.

63. The apparatus of claim 52, wherein the information is sent to the base station on uplink time-frequency resources allocated for sending acknowledgment/negative acknowledgment (ACK/NACK) feedback.

64. The apparatus of claim 52, wherein the information is sent in addition to a regular CQI report configured for a sub-band.

65. An apparatus for wireless communication, comprising:
a memory; and
at least one processor coupled to the memory and configured to:
transmit a packet to a user equipment (UE), the packet having a first modulation and coding scheme (MCS);
receive information from the UE only if the UE fails to decode the packet, wherein the information comprises channel quality information (CQI) relating to an interference condition corresponding to time-frequency resources allocated for the transmitted packet, and a data channel quality information (DCQI) report corresponding to time-frequency resource blocks on which data is allocated;
optimize the packet, based on the received information, to have a second MCS, the second MCS being different from the first MCS; and
retransmit the optimized packet to the UE.

66. The apparatus of claim 65, wherein the information further comprises an amount of the packet decoded at the UE.

67. The apparatus of claim 65, the at least one processor further configured to receive an acknowledgment (ACK) from the UE when an entirety of the packet is decoded at the UE.

68. The apparatus of claim 65, the at least one processor further configured to receive a negative acknowledgment (NACK) from the UE when an entirety of the packet is not decoded at the UE.

69. The apparatus of claim 65, wherein the information relates to one or more time-frequency resources in which the packet or a previously transmitted packet is transmitted.

70. The apparatus of claim 65, wherein the information relates to one or more subframes in which interference is expected at the UE.

71. The apparatus of claim 65, the at least one processor further configured to transmit a signal to the UE for enabling or disabling the UE to determine and send the information.

72. The apparatus of claim 71, wherein the signal is at least one of a UE-specific signal or a cell-specific signal.

73. The apparatus of claim 72, wherein the UE-specific signal is a downlink grant.

74. The apparatus of claim 71, wherein the transmitted signal dynamically enables or disables the UE to determine and send the information.

75. The apparatus of claim 65, wherein the information is received on uplink time-frequency resources allocated for receiving acknowledgment/negative acknowledgment (ACK/NACK) feedback.

76. The apparatus of claim 65, wherein the information is received in addition to a regular CQI report configured for a sub-band.

77. A non-transitory computer-readable medium storing computer executable code for wireless communication, comprising code for:
receiving a first packet from a base station, the first packet having a first modulation and coding scheme (MCS);
attempting to decode the first packet;
determining information to provide to the base station only if the first packet fails to be decoded, wherein the information comprises channel quality information (CQI) relating to an interference condition corresponding to time-frequency resources allocated for the received first packet, and a data channel quality information (DCQI) report corresponding to time-frequency resource blocks on which data is allocated;

sending the information to the base station; and receiving a second packet from the base station, the second packet being an optimized version of the first packet and having a second MCS, the second MCS is different from the first MCS and is determined based at least in part on the determined information provided to the base station.

78. A non-transitory computer-readable medium storing computer executable code for wireless communication, comprising code for:

transmitting a packet to a user equipment (UE), the packet having a first modulation and coding scheme (MCS);

receiving information from the UE only if the UE fails to decode the packet, wherein the information comprises channel quality information (CQI) relating to an interference condition corresponding to time-frequency resources allocated for the transmitted packet, and a data channel quality information (DCQI) report corresponding to time-frequency resource blocks on which data is allocated;

optimizing the packet, based on the received information, to have a second MCS, the second MCS being different from the first MCS; and retransmitting the optimized packet to the UE.

79. The method of claim 1, wherein the CQI is further related to a channel condition determined based at least in part on the received first packet.

* * * * *